Figure 1:
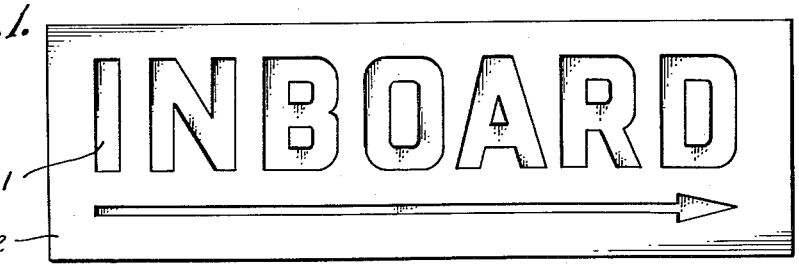

Dec. 13, 1960   W. M. STERRY   2,963,805
PORCELAIN ENAMELED FOIL LABELS
Filed Sept. 3, 1957

RADIUS = 0.1"

INVENTOR.
WILLIAM M. STERRY
BY
Reynolds, Beach & Christensen
ATTORNEYS

2,963,805
PORCELAIN ENAMELED FOIL LABELS

William M. Sterry, Seattle, Wash., assignor to Boeing Airplane Company, Seattle, Wash., a corporation of Delaware Filed Sept. 3, 1957, Ser. No. 681,606

1 Claim. (Cl. 40—2)

The present invention relates to a label of general utility made of foil such as aluminum foil, although other metals can be used, and having a coating of porcelain enamel on at least one surface which defines indicia. The label can be secured to a wide variety of backing surfaces by suitable adhesive.

Name plates, emblems and other articles of material sufficiently thick to be rigid and bearing porcelain enamel surface coatings defining indicia have been used in the past. Also, porcelain enamel coatings have been applied to various articles for marking purposes. In addition, vitreous decalcomanias have been fired and fused to ceramic, porcelain and glass surfaces.

Consequently, the advantages of providing markings on articles by the use of porcelain enamel has been recognized. Such advantages include the ability to use a wide variety and combination of colors which do not fade. Such fired porcelain enamel surfaces are also highly resistant to abrasion and deterioration by weather and heat up to temperatures of 600 degrees Fahrenheit to 800 degrees Fahrenheit. The disadvantages of using porcelain enamel finishes for such marking purposes are the brittle character of such finishes which have heretofore been thought to require their use only on rigid surfaces and the necessity of baking or firing the porcelain enamel after its application in order to cause it to adhere to the surface to which it is applied and to develop its characteristic hardness as it is fused to the surface to which it is applied.

A principal object of the present invention is to provide a label having the advantages of a porcelain enamel surface mentioned above while eliminating the commercial objection to its disadvantages mentioned. A specific object is to provide a label having high abrasion and weather resistance and fast colors which can be applied easily and quickly to the surfaces of articles without requiring to be baked onto such backing surfaces. At the same time, the marking will be virtually as effective as though the porcelain enamel colored coating actually were baked onto the surface of the article to be labeled. It is a particular object to provide indicia formed by porcelain enamel on a carrier sheet which can be applied securely and unobtrusively to a backing surface and which carrier sheet is consequently very thin and flexible.

A further object of the invention is to provide a label or marking device having the advantages of a vitreous declacomania or porcelain enameled indicia coating while being comparatively inexpensive because the porcelain enamel can be baked onto the carrier sheet rather than requiring the article itself to be baked.

It is also an object virtually to eliminate the disadvantages of the brittle character of fired porcelain enamels.

In general the foregoing objects can be accomplished by applying to a metal foil a thin porcelain enamel coating covering one entire surface of the foil. The porcelain enamel is then baked to harden it and subsequently is etched to remove portions for defining indicia. An adhesive may then be applied to the side of the foil opposite that bearing the porcelain enamel by which the foil label can be bonded to the surface of an article to be marked.

Figure 1 is a face view of a representative completed porcelain enamel foil label.

Figures 2 to 7, inclusive, are longitudinal sectional views through metal foil in successive stages of processing from the initial foil stock to the completed porcelain enameled foil label.

Figure 8:
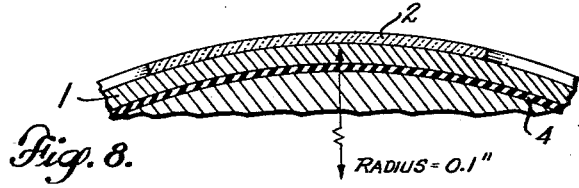

Figures 8 is a greatly enlarged edge sectional view of a fragment of the completed label in bent shape.

Baked porcelain enamel coatings are very brittle and are inclined to crack when bent and be loosened from the surface to which they are applied. Consequently, it has been uniform practice to apply porcelain enamel coatings only to articles sufficiently rigid so that the coating carrying surface cannot be bent to cause the fired porcelain enamel coating to crack. It has also been necessary to bake the article in order to harden the ceramic coating of porcelain enamel even though it may have been applied to the surface in the form of a decalcomania. The foil label of the present invention utilizes an exactly opposite technique from that previously used in that the porcelain enamel is applied to and baked on a carrier sheet which is very thin and easily bent. Preferably such sheet is a metal foil and of a thickness from .001 to .005 of an inch.

In order to be able to employ a porcelain enameled coating practically on such a thin carrier sheet it has been found that if the porcelain enamel coating is sufficiently thin it will be retained on such a carrier sheet even though the sheet is bent quite sharply. The surface of a thin carrier sheet does not change in dimension when bent as much as a thick sheet. In being bent the neutral axis of a sheet remains constant in length and the concave surface is reduced in extent along the arc of the bend whereas the convex side is stretched along the arc of the bend. A porcelain enamel coating carried by the surface of a sheet will tend to be contracted or stretched to the same extent as the surface of the carrier sheet to which it is bonded. The thinner the carrier sheet, therefore, the less will be the tendency for the porcelain enamel coating to change dimensions as the carrier sheet is bent.

Moreover, if the porcelain enamel coating is considered to be an integral part of the entire sheet article being bent, the thinner the coating, the thinner will be the overall thickness of the composite sheet so that the less the coating, as a part of the sheet surface, will be stretched or contracted as the sheet is bent. Also, the difference in extent of stretching or contraction between the inner and outer sides will be less. A very thin coating of porcelain enamel inherently is more flexible than a thicker coating because of the smaller difference in dimensional change between the exposed surface and the bonded surface for a given bend of a particular backing sheet. It is therefore desirable that the porcelain enamel coating be as thin as possible as well as the carrier sheet being thin.

The final product will also include a layer of adhesive and a protective sheet on the side of the foil carrier sheet opposite the porcelain enamel coating. While these layers will increase the total thickness of the final label so that the stretch or contraction of the surfaces of the composite sheet will vary correspondingly as the composite sheet is bent, the aggregate thickness of the composite label will still be quite small and in fact small enough so that there would be only a very slight dimensional change edgewise in the porcelain enamel coating.

Finally, the finished foil label will bear indicia formed by removing a portion of the porcelain enamel layer for its full thickness so as to render the porcelain enamel coating discontinuous. Consequently, the stresses and strains produced by bending of the label cannot accumulate across the interruptions in the porcelain enamel layer. The center of each section around the arc of the bend thus constitutes a neutral point at opposite sides of which stretching or contraction of the porcelain enamel coating occurs depending upon whether the curvature is convex or concave.

Figure 2:

The structural characteristics of the porcelain enameled sheet label can be appreciated more readily by understanding the procedure by which such a label is made. In Figure 2 a thin carrier sheet 1 is shown in section which preferably is a thickness of .001 to .005 of an inch. This carrier sheet may be of metal foil and aluminum foil is quite satisfactory because of its strength and light weight. This carrier sheet also should be of a type of material to which porcelain enamel will bond securely when baked and which preferably is not deteriorated by heat of several hundred degrees Fahrenheit and is reasonably abrasion resistant. The carrier sheet also should be capable of being bent sharply without being ruptured. Metal foil satisfies these requirements.

Figure 3:

To one side of the carrier sheet 1 is applied the coating 2 of porcelain enamel as shown in Figure 3. The porcelain enamel can be sprayed onto the surface of the sheet 1, or the carrier sheet can be dipped into a porcelain enamel bath in which case both faces of the carrier sheet will be coated. The thickness of this coating should be uniform and from .0005 to .0015 of an inch thick. For purposes of illustration the porcelain enamel layer 2 is shown as being approximately one-half as thick as the backing sheet 1. If foil, .003 of an inch in thickness, for example, is used for the carrier sheet, the porcelain enamel coating would therefore be .0015 of an inch in thickness. Usually, however, the layer of porcelain enamel would be substantially less than one-half the thickness of the carrier sheet.

After the porcelain enamel coating has dried the coated carrier sheet will be baked to harden the porcelain enamel coating. The coated sheet can be baked for about six minutes at a temperature of 1,000 degrees Fahrenheit, for example. It is therefore important that the carrier sheet 1 be of a material which will withstand such a heating operation. Also, it is desirable for the porcelain enamel coating to cover at least one side of the carrier sheet in its entirety to eliminate the possibility of local wrinkling which might be caused by differential expansion of the porcelain enamel layer and carrier sheet if the coating 2 were interrupted in local areas. Warping of the entire composite sheet during such heating is not of great concern because the composite sheet will probably return substantialy to flat condition when it has cooled again and in any event, because it is so thin, the composite sheet can be bent back into flat condition or even oppositely bent quite easily.

The next step is to remove portions of the baked and hardened porcelain enamel coating in a discontinuous pattern to form the indicia. In the illustration of Figure 1 the porcelain enamel coating has been removed in areas in the shape of letters to expose the carrier sheet. Alternatively, portions of the porcelain enamel coating could be removed so that the parts of the coating remaining bonded to the carrier sheet would be in the form of letters or other indicia. In either case the portions of the coating to be removed are etched by etching agents effective to dissolve the hardened porcelain enamel. An effective etching procedure which will remove hardened porcelain enamel but which will not appreciably deteriorate an aluminum foil carrier sheet is to soak the coated carrier sheet for about five minutes in a solution of ammonium bifluoride ($NH_4FHF$) in an aqueous solution containing 20 percent by weight followed by soaking the coated sheet for about three to four minutes in an aqueous solution containing 15 percent by weight of nitric acid ($HNO_3$) and 3 percent by weiht of hydrofluoric acid (HF).

The baths of both types can be at room temperature. It may be necessary to increase the soaking time somewhat for thick porcelain enamel coatings and perhaps an effective coating removing action can be accomplished in less time for very thin coatings, but the times given are average. Also, the concentration of the solutions specified is not critical although a longer soaking period will be required if the solutions are weaker. By this soaking operation the porcelain enamel coating will be removed from all areas exposed to the etching solutions. If the carrier sheet has been coated with porcelain enamel by dipping it in a bath of the porcelain enamel so that both sides of the carrier sheet are coated over their entire surfaces and one of these entire surfaces is exposed to the etching agent baths in the manner described, the entire coating will be removed from one side of the carrier sheet. Following the etching operation the sheet material should be rinsed and dried.

Figure 4:

In order to remove the hardened porcelain enamel coating from the carrier sheet in only selected areas for the purpose of forming indicia the portions of the porcelain enamel coating which it is desired to leave bonded to the carrier sheet must be protected from the action of the etching solutions. Also the carrier sheet must be of a material which will not be appreciably affected by the etching solutions. The first step in protecting during the etching operation the portions of the hardened porcelain enamel coating which it is desired to leave bonded to the carrier sheet is illustrated in Figure 4. First the hardened porcelain enamel surface is processed by a lithographic printing press or by a silk screen process so that ink is applied to the areas of the porcelain enamel coating which it is desired to preserve and the area to be removed by etching remains exposed.

Figure 5:

The entire surface of the porcelain enamel coating is then covered with fine powdered material such as of rosin and this powder adheres to the inked portion of the coating. All loose powder is then removed by suction and the powder adhering to the inked portion of the coating is fused by heat supplied, for example, by infrared ray lamps which heat the sheet to about 400 degrees Fahrenheit. The fused rosin forms the overlay 3 shown in Figure 4 which is interrupted to expose the portions of the porcelain enamel coating 2 which are to be removed by the etching process described above. Figure 5 shows the condition of the sheet following the etching operation in which the portions of the porcelain enamel coat exposed through the masking layer 3 have been removed but the etching operation has not appreciably affected the exposed side of the carrier sheet 1 or those portions of it exposed to the etching solutions after the porcelain enamel coating portions have been removed.

The protective layer 3 is shown as being of a thickness approximately equal to the thickness of the porcelain enamel layer but the thickness of such protective layer is not at all critical. It is important, however, that the protective layer form smooth and sharply defined lines around the portions of the porcelain enamel coating to be removed by the etching operation. The detail of the remaining porcelain enamel coating will thus be rendered much sharper than would be obtained if an attempt were made to deposit the porcelain enamel in liquid form initially only in the areas of the carrier sheet which it is desired to have covered by the porcelain enamel coating to form the required indicia. After the portions of the porcelain enamel coating to be deleted have been removed as shown in Figure 5, the protective masking material layer 3 can be removed by scrubbing and dissolving it in lacquer thinner such as a ketone, for example, acetone or methyl ethyl ketone.

Figure 6:
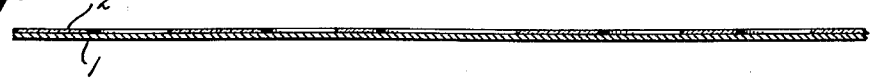

As shown in Figure 6 the composite sheet formed of the carrier sheet 1 and the interrupted hardened porcelain enamel coating 2 forming indicia will present the label face in its finished form. The porcelain enamel used may have either a glossy or mat finish depending upon the type of enamel selected. Also the porcelain enamel of desired color will be used. The exposed portions of the carrier sheet 1 will have a bright finish or a mat finish depending upon the initial finish of the foil if the carrier sheet is of metal foil. The hardened porcelain enamel coating is highly resistant to fading of the color and abrasion and will not be affected adversely by temperatures as high as 600 degrees Fahrenheit or higher.

With the indicia formed by fired porcelain enamel on the carrier sheet 1, the resulting label can be secured to any type of surface whether flat or curved to which the carrier sheet can be bonded. A convenient provision for mounting the carrier sheet is the application to its face opposite the porcelain enamel coating of a layer 4 of pressure sensitive adhesive which is covered by a protective sheet 5 of cellophane, for example. While the thickness of the adhesive layer and of the cellophane sheet is small, this thickness constitutes a substantial portion of the complete thickness of the composite sheet shown in Figure 7. If the carrier sheet is foil of a thickness .003 of an inch, the thickness of the adhesive layer 4 and protective cellophane sheet 5 is exaggerated because together they probably will be about .001 of an inch.

The adhesive may be of a conventional pressure-sensitive type manufactured by Minnesota Mining and Manufacturing Company from which the protective cellophane sheet 5 can be removed by wetting the label briefly and then peeling the protective cellophane from the adhesive coating. The neutral axis of the completed composite sheet coincides approximately with the center of the carrier sheet because of the porcelain enamel layer on one side and the adhesive and cellophane on the other side of such carrier sheet. The stretching or contraction of the porcelain enamel layer 2 effected by bending the composite label with the cellophane in place before the cellophane sheet 5 has been stripped from the label preparatory to its application to an article would therefore be somewhat greater than after the cellophane sheet has been removed, but there is no reason for bending such a label during its production or general handling. The label must be bent rather sharply, however, in applying it to some types of article to be labeled, but since the cellophane protective sheet will then have been removed the layer 2 will be subjected to less stress both because the label is thinner and the neutral axis is shifted toward the porcelain enamel layer.

Figure 7:
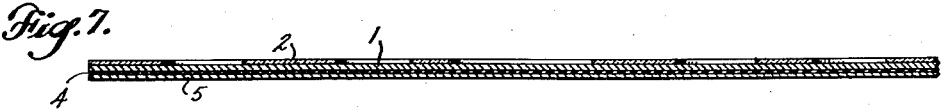

If the finished label shown in Figures 1, 6 and 7 is bonded to a flat surface the label will be substantially as attractive and durable as if the porcelain enamel had been applied directly to the surface of the article itself and the article had then been fired to harden the porcelain enamel in place. Substantially the same attractiveness and durability can be obtained even when the label is applied to a rather sharply curved surface. In Figure 8 a label is shown applied to an article having a curvature of a radius only one-quarter of an inch which could, for example, be the shaft of a golf club. While this is an extreme example it will be seen that because of the comparatively small thickness of the carrier sheet 1 and the porcelain enamel coating 2 as compared to the radius of curvature, the curvature of a section of the coating appears to be comparatively gradual.

Because of the thinness of the carrier sheet 1 and the thinness of the porcelain enamel coating, there is a minimum change in dimension of the coating when the label is bent on a given degree of curve. Also, as mentioned previously, the interrupted nature of the coating making each arcuate section relatively short reduces the accumulation of stresses and strains so as to minimize the tendency for the coating to crack. Even if the coating should crack, however, it would crack at closely spaced locations because of the thinness of the coating so that the cracks would not be visible without magnification. Also, since the cracks would be produced by comparatively small stress because of the thinness of the coating a shear stress between the carrier sheet and the coating of a magnitude sufficient to loosen the porcelain enamel from the carrier sheet would not occur. The presence of cracks, therefore, would not detract from the appearance of the label and would not appreciably decrease its weather resistant and durability characteristics.

I claim as my invention:

A porcelain enameled label comprising an uninterrupted carrier sheet of a thickness from 0.001 to 0.005 of an inch and having on one surface thereof a coating of porcelain enamel of a thickness less than the thickness of said carrier sheet and not greater than 0.0015 of an inch, which coating is removed at spaced locations for its entire thickness to define indicia.

References Cited in the file of this patent

UNITED STATES PATENTS

| | | |
|---|---|---|
| 528,513 | Davis | Oct. 30, 1894 |
| 2,076,387 | Stupell | Apr. 6, 1937 |
| 2,095,879 | Kittredge et al. | Oct. 12, 1937 |
| 2,301,741 | Morris | Nov. 10, 1942 |
| 2,424,353 | Essig | July 22, 1947 |
| 2,469,123 | Martin | May 3, 1949 |
| 2,480,711 | Calton | Aug. 30, 1949 |
| 2,493,984 | McKay | Jan. 10, 1950 |
| 2,580,406 | Calton | Jan. 1, 1952 |
| 2,699,618 | Stupell | Jan. 18, 1955 |
| 2,827,393 | Kadisch et al. | Mar. 18, 1958 |

FOREIGN PATENTS

| | | |
|---|---|---|
| 593,795 | Great Britain | Oct. 27, 1947 |